(12) United States Patent
Klein et al.

(10) Patent No.: US 10,010,915 B2
(45) Date of Patent: Jul. 3, 2018

(54) METHOD FOR PRODUCING A METAL STRIP BY CASTING AND ROLLING

(71) Applicant: SMS Group GmbH, Düsseldorf (DE)

(72) Inventors: Christoph Klein, Kreuztal (DE);
Christian Bilgen, Duesseldorf (DE);
Christian Klinkenberg, Herdecke (DE); Michael Pander, Cologne (DE);
Luc Neumann, Duesseldorf (DE);
Dieter Rosenthal, Niederfischbach (DE); Cosimo Andreas Cecere, Langenfeld (DE)

(73) Assignee: SMS Group GmbH, Duesseldorf (DE)

( * ) Notice: Subject to any disclaimer, the term of this patent is extended or adjusted under 35 U.S.C. 154(b) by 421 days.

(21) Appl. No.: 14/772,092

(22) PCT Filed: Mar. 10, 2014

(86) PCT No.: PCT/EP2014/054612
§ 371 (c)(1),
(2) Date: Nov. 18, 2015

(87) PCT Pub. No.: WO2014/135710
PCT Pub. Date: Sep. 12, 2014

(65) Prior Publication Data
US 2016/0067753 A1    Mar. 10, 2016

(30) Foreign Application Priority Data

Mar. 8, 2013   (DE) .................. 10 2013 204 059
Mar. 14, 2013  (DE) .................. 10 2013 204 434

(51) Int. Cl.
*B22D 11/00*   (2006.01)
*B21B 1/26*    (2006.01)
(Continued)

(52) U.S. Cl.
CPC ............. *B21B 1/26* (2013.01); *B21B 45/004* (2013.01); *B22D 11/00* (2013.01); *C21D 1/00* (2013.01);
(Continued)

(58) Field of Classification Search
CPC ............. B21B 1/26; C21D 1/00; B22D 11/00
See application file for complete search history.

(56) References Cited

U.S. PATENT DOCUMENTS 2,448,011 A   8/1948  Baker
4,778,971 A  10/1988  Sakimoto
(Continued)

FOREIGN PATENT DOCUMENTS

SU         100204      12/1951

OTHER PUBLICATIONS

Christian Bilgen et al., From CSP® to CSP® flex: the new concept for thin slab technology, Millennium Steel 2012, pp. 90-96.

*Primary Examiner* — Scott R Kastler
(74) *Attorney, Agent, or Firm* — Abelman, Frayne & Schwab

(57) ABSTRACT

A method for producing a metal strip (1) by casting and rolling, wherein first a slab (3) is cast in a caster (2) by dispensing metal from a mold (4), wherein the slab (3) is deflected from the vertical direction to the horizontal direction in the region of a strand guide (5), wherein the slab (3) is then tempered in a furnace (6), wherein the slab (3) is rolled in a rolling train (7) after the furnace (6) and wherein the slab (3) is processed either in discontinuous batch operation or in continuous or semi-continuous operation in dependence on a specified manner of operation. According to the invention, in order to create optimal process conditions for all desired operating modes, the slab (3) to be rolled or the metal strip (1) being rolled is subjected to heating in the region of the rolling train (7) at least between two roll stands (8, 9, 10, 11, 12, 13, 14) by means of an inductor (15).

9 Claims, 4 Drawing Sheets

(51) Int. Cl.
 *B21B 45/00* (2006.01)
 *C21D 1/00* (2006.01)
 *C21D 1/42* (2006.01)
 *C21D 6/00* (2006.01)
(52) U.S. Cl.
 CPC ............... *C21D 1/42* (2013.01); *C21D 6/00* (2013.01); *Y02P 10/253* (2015.11)

(56) References Cited

U.S. PATENT DOCUMENTS

| | | |
|---|---|---|
| 4,817,703 A | 4/1989 | Rohde |
| 5,307,864 A | 5/1994 | Arverdi |
| 5,401,941 A | 3/1995 | Mauve |
| 5,611,232 A | 3/1997 | Rohde |
| 5,802,902 A | 9/1998 | Rosenthal |
| 5,910,185 A * | 6/1999 | Figge ............... B21B 37/50 219/653 |
| 6,062,055 A | 5/2000 | Bobig |
| 6,092,586 A | 7/2000 | Schoenbeck |
| 6,290,784 B1 | 9/2001 | Yasuhara |
| 7,343,961 B2 | 3/2008 | Arvedi |
| 8,011,418 B2 | 9/2011 | Rosenthal |
| 8,365,806 B2 | 2/2013 | Rosenthal |
| 8,601,851 B2 | 12/2013 | Seidel |
| 8,734,601 B2 | 5/2014 | Klinkenberg |
| 8,950,227 B2 | 2/2015 | Hohenbichler |
| 2005/0115649 A1 | 6/2005 | Tokarz |
| 2008/0028813 A1 | 2/2008 | Arverdi |
| 2016/0067753 A1* | 3/2016 | Klein ............... B21B 1/26 148/557 |

* cited by examiner

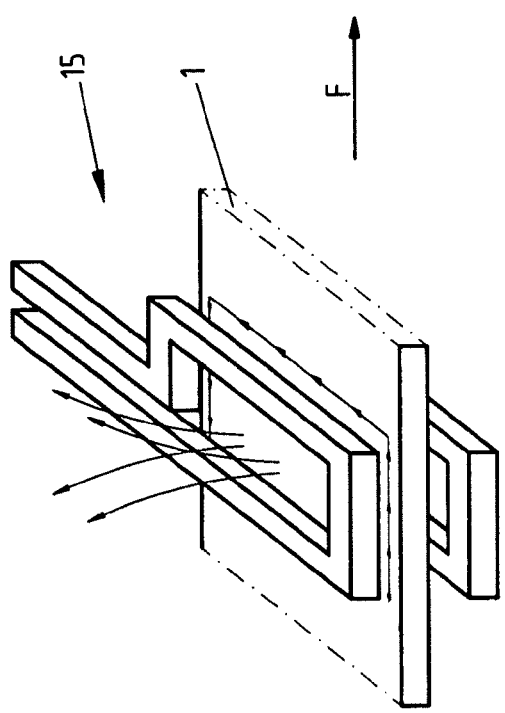

METHOD FOR PRODUCING A METAL STRIP BY CASTING AND ROLLING

The invention relates to a method for producing a metal strip by casting and rolling, wherein first a slab is cast in a caster by dispensing metal from a mold, wherein the slab is deflected from the vertical direction to the horizontal direction in the region of a strand guide, wherein the slab is then tempered in a furnace, wherein the slab is rolled in a rolling train after the furnace and wherein the slab is processed either in discontinuous batch operation or in continuous or semi-continuous operation in dependence on a specified manner of operation.

The present invention is usable with casting and rolling installations which produce a finished metal strip from liquid metal in a first operational mode, namely, during continuous operation, or during semi-continuous operation, and/or also during batch operation.

The known casting and rolling trains convert, typically during the batch operation, in a compact installation, liquid steel in a hot strip. With this mode of operation, after casting or casting and rolling, slabs or pre-trips are so separated in single slabs or single pre-strips that after hot rolling, coils of a desired size are formed.

Then, continuously cast slabs are cast. These slabs are separated by shears so that their dimensions later results in obtaining coils of a desired size. In heating furnaces, which are often formed as roller hearth furnaces, the separated slabs are tempered. In addition, the furnace serves as a buffer, in which the slabs can be stored when delays in the operational process occur. Finally, the slabs are separately transported to the rolling train and are rolled. The finished rolled strips are cooled in a cooling line and wound up. The coils are then transported from the rolling line for further processing. DE 10 2009 057 524 A1 discloses a method and rolling mill for hot rolling a metal strip or a metal sheet in several steps.

At a semi-continuous process, the slabs are so cut that two or more coils can be produced from a cut slab. Behind the rolling mill, flying shears are located which divide a long hot strip so that a desired coil size is obtained. This method permits to reduce the number of insertion and exit processes which are critical during rolling, so that thinner hot strips can be reliably produced.

During a continuous operation, the continuously cast slabs are transported to the rolling mill without being separated. After the rolling mill, as during the semi-continuous operation, behind the rolling mill, flying shears are located which divide a long hot strip so that a desired coil size is obtained. This method permits to further reduce the number of insertion and exit processes which are critical during rolling, in comparison with the semi-continuous process, so that a greater number of thinner hot strips can be reliably produced.

The used here CSP-installation (Compact Strip Production) are casting and rolling installations in which two, separately executed process steps for production steel strips are closely connected with each other, namely, casting the liquid steel into thin slabs in a caster and rolling of thin slabs into steel strips in a rolling installation. At that, usually, the rolling of a previously cast strand takes place by using the casting heat or by obtaining the desired temperature by using an equalization furnace or a heating device arranged between the caster and the rolling train.

The object of the invention is to provide such process conditions for all of the mentioned operational modes, i.e., for the batch operation, continuous operation, and semi-continuous operation, that optimal production of a metal strip can be obtained. Correspondingly, optimal process conditions should be provided for all of the operational modes.

The object of the invention is achieved by the present invention that is characterized in that the to-be-rolled slab or the rolled strip is subjected to heating, in the region of the rolling train, at least between two rolling stands by means of one or more inductors.

The rolling train is, preferably, a tandem rolling train, wherein heating takes place, by the inductor located, viewing in the transportation direction, between first two rolling stands of the tandem rolling train. However, according to another advantageous embodiment of the method, it is possible that the rolling train is a tandem rolling train, wherein heating takes place, by the inductor located, viewing in the transportation direction, between first three rolling stands of the tandem rolling train.

According to further advantageous embodiment, the slabs can have their thickness reduced, in the region of the strand guide, by a plurality of rollers.

The slabs can also be subjected to thickness reduction in a region behind the caster and before the furnace, in a roughing stand.

The inductor is advantageously formed for heating the slab or the metal strip transported in the transportation direction by an inductive longitudinal field heating. It is also possible to form the inductor for heating the slab or the metal trip transported in the transportation direction by an inductive transverse field heating. The respective field heating will be explained further below.

An element having at least one open, partially C-shaped induction spool, is preferably used as an inductor. One of advantageous embodiments of the inductors includes spools that can be switched, as needed, for producing a longitudinal or transverse field induction.

The casting and rolling installation can be formed of one or several roughing stands, wherein during the batch operation, the cutting of the slab takes place before the rolling train, preferably, as late as possible after up to five roughing stands preceding the rolling train.

The casting and rolling installation can also consist of one or several roughing stands, wherein during the continuous operation, the cutting of the slab takes place after the last stand in the rolling train.

There can be further provided that in all of the above-mentioned modes of operation, the separation of the slab takes place before the furnace. When roughing stands are arranged before the furnace, separation of the slabs takes place, preferably, as late as possible after the roughing stands.

The proposed modus operandi provides for a combination of continuous and individual (batch operation) production of a hot strip in then slab installations as well as production of hot rolled steel strip and sheet with the same microstructure and mechanical properties and having thick and thin hot strip dimensions.

The combination of continuous mode of operation, semi-continuous mode of operation, and batch operation takes place in the same thin slab installation with an aim to combine advantages of all of the method s in a single installation and thereby enable an economical production of thick and thin hot strips from thin slabs in a hybrid installation.

Up to the present, a manufacturer of hot strips have to decide, during selection of a production installation, which type of the installation to be used, i.e., which of the continuous operation, semi-continuous operation, or batch operation is to be used. This decision, because of the design of the installation, was not revisable. Because both installation concepts differ in their product portfolio, one has to decide which market segment the operator can serve.

The existing, up to the present, concepts of continuous installations enable only a stable production of hot strips with a substantially reduced geometry (strips with a thickness of less than 2 mm). Hot strips with a different geometry could not be produced, as a rule, in this installation with a continuous mode of operation. With an increased hot strip thickness, e.g., the exit speed in the rolling train is reduced and, thus, also the finishing stand temperature. Also, up to now, the available installation concepts for a continuous operation required interruption of production in case of disturbances during operation or for exchange of work rolls. In practice, it took place by deflection of the cast stand and interruption of cast sequence, or by cutting and removal of intermediate slab segments from the production installation. The resulting reject reduced the output and economy of such installation designed for a pure continuous operation.

The installations for the batch operation can produce a wide spectrum of hot strips from different steel grades and with different dimensions. Though, there are certain limitations in the region of very thin sizes. Thus, during production of very thin strips in a batch operation, the disturbances encountered in the rolling train (e.g., height defects) are greater than during a continuation operation. In addition, the work roll wear is smaller in a continuous operation than in a batch operation.

The present invention for the first time, made possible combination of batch-, semi-continuous and continuous operation in a hybrid installation. Thereby, the above-mentioned limitations are eliminated. The described modus operandi enables production, in the same installation, of thick hot strip, e.g., for producing tubes, and of thin and ultra thin hot strips up to a thickness of 0.8 mm. The combined operation of such an installation permits, by switching from a continuous operation to a batch operation, a single work roll change, without interrupting the casting sequence and without a need in a break-up or producing reject.

Correspondingly, there is proposed a configuration of an installation that is equally suitable for batch-, semi-continuous, and continuous operation. To this end, the known installations (e.g., embodiments in DE 44 02 402 A1 and WO 2011/067315) which are formed, respectively, of at least one thin slab caster, a tunnel furnace, and a rolling train, are modified by providing induction heating means at least between the first and second stands. There can be provided further equipment that permits conducting, in addition to a batch operation, also the continuous and semi-continuous operation.

To this, belong specific casters with a high mass flow, preferably such in which during bending of a strand from a vertical to a horizontal, solidification of slab core takes place. This increases the production capacity and the temperature at the last roll, in particular, during continuous operation.

Further, one or more roughing stands can be arranged between a caster and the tunnel furnace. A particularly advantageous embodiment includes inline rolling stands also called C.R. (core reduction) stands.

Further, induction heating means can be provided in front of the furnace to compensate loss of temperature between the caster and the furnace. This enables, e.g., an increased productivity in the batch and/or semi-continuous operation because time of heating in the furnace is eliminated completely or at least partially.

Also, flying shears and coilers can be provided. The coiler can be formed as down coiler or rotor coiler (e.g., such as disclosed, e.g., in EP 1 003 617 B1). In continuous operational mode or in a semi-continuous mode, preferably, at least one coiler, e.g., a rotor coiler is provided.

At suitable points of the production line, e.g., in front of the inlet of the rolling train, further induction heating means according to the proposed modus operandi can be provided which makes the process even more flexible with regard to the obtainable product spectrum. They enable, if needed, election of the most suitable energy carriers (gas in the furnace, current in the inductors).

The proposed modus operandi enables the user to cover a wide market segment. The installation operator can then select a suitable manufacturing mode for his product. The operator can acquire an installation for batch or continuous operation and which can be modified for the proposed modus operandi. Such a modified installation is one aspect of the proposed solution.

The above-described modus operandi enables production of both a hot strip for manufacturing tubes, in particular, according to API (American Petroleum Institute) and similar standards, with a hot strip thickness less than a quarter o the slab thickness, and production of thinner hot strips less than 0.8 mm.

A further advantage consists in that a respective energy-efficient production method can be selected. This means that for small hot strip thicknesses, as a rule, a continuous process is preferable. Thicker hot strip can be produced more energy-efficiently by a batch method.

In comparison with a pure continuous installation, the proposed installation has an increased production capacity because a batch operation with two strands is possible.

The proposed concept of a rolling mill provides for a suitable arrangement of induction heating means (inductors) between the rolling strands. According to a possible embodiment, the inductors can be located between first pair of strands of a tandem rolling train in a CPS-installation for production of high-strength steel goods in order to achieve a uniform structure of a hot strip by complete recrystallisation. According to a further advantageous embodiment, it is possible to locate the inductors between first three stands of a tandem rolling train in a CSP-installation for producing goods by a continuous process, whereby it is possible to insure the necessary end rolling temperature.

The use of inventive induction heating permits to minimize an achievable end strip thickness. By increasing the temperature, reduction of rolling forces is achieved.

The use of the proposed induction heating maximizes the achievable end strip thicknesses of high-strength steel goods (e.g., API-goods).

The inlet thickness of rolling goods in a rolling train preferably lies in a range between 10 mm and 120 mm.

The proposed modus operandi is contemplated in combination with roughing stands preceding the rolling train. Advantageously, GR-stands (Core-Reduction Stands) are provided, whereby an "Inline"-Manufacturing can be contemplated, i.e., the roughing stands are arranged at the outlet of a caster. The mode-dependent separation of slabs takes place during batch, semi-continuous, and continuous operation after the slabs leave the roughing stands during subsequent movement along the manufacturing line.

With regard to separate operational mode, the following can be noted:

In a batch operation, the separation (according to the operational mode) of slabs takes place in front of the rolling train, preferably, as late as possible after the last roughing stand preceding the rolling train.

In a continuous operation, the strand-cast slabs (according to the operational mode) are fed to the rolling mill in an unseparated state. The separation of the finished rolled hot strip takes place after the last stand in the rolling train.

In semi-continuous operation, the separation(according to the operational mode, of an elongate strand-cast slab takes place before the tunnel furnace, preferably as late as possible after the last of the roughing stands preceding the furnace. The corresponding maximum slab length corresponds to the length of the tunnel furnace. This lengthy slab is rolled in an unseparated state, and the finished rolled hot strip in separated in coil lengths after the last stand of the rolling train. The advantages of separate operational modes are as follows:

In a batch operation steel gauge-dependent, thick hot strip dimensions from about 1 mm to over 25 mm can be produced. Large reduction takes place in the first pair of stands in the rolling line and/or thermomechanical rolling of high-strength steels that requires a complete recrystallisation takes place after the first two stands in the rolling train. To this end, induction heating takes place between the two stands and, if needed, between the following two stands in the rolling train for the same reasons.

In continuous operation, the cast operation, the cast format and the cast speed of the predetermined mass flow results in a reduced end rolling speed and thereby in a reduced end rolling temperature. For compensation, induction heating can be carried out between separate stands. Therefore, thinner dimensions, typically with hot strip thickness of less than 2 mm as in a batch operation, can be produced with reduced danger of height defects ("cobbles") because those primarily occur during threading of a slab or a pre-strip head into the stand in the rolling train. In distinction from the batch operation, in a continuous operation, the hot strip thicknesses of more than 2 mm is difficult to produce because of the reduced exit speed in the rolling train.

The so-called hybrid operation is a combination operation. Here, at least two operational modes "batch," "continuous" and "semi-continuous" can be carried out without loss of quality and productivity.

A particular object is to be able to meet different requirements with regard to position and characteristics of the induction heating. Thick dimensions require, as a rule, induction heating with heating in a longitudinal field. For rolling in a batch mode, therefore, as a rule, longitudinal field inductors are needed. Thinner dimensions in a continuous operation require, contrary to this, as a rule, an induction heating with heating in a transverse field. In semi-continuous operation, both types of induction heating can be needed, because, herein in view of rolling speed being independent on the casting speed, both thin finished strips of less than 2 mm and thick finished strips with a thickness of more than 2 mm can be rolled.

A hybrid installation should be able to use at least one of the above-mentioned induction types or both together. The induction heating can be provided, according to the requirements, at different positions of the process course. High flexibility of the installation is insured, e.g., by use of a partially open C-shaped induction spools. The special spools, in case of need, can be switched between longitudinal or transverse field heating. In addition, the gap width between the rolled good and the inner side of the spool can be adapted to an optimal efficiency level.

For longitudinal field heating reference is made to U.S. Pat. No. 2,448,011. It discloses a device for a longitudinal field heating of steel strips in which the heated steel strip is fed through the inner space of a cylindrical induction spool that generates a magnetic alternating field in the metal stock, with its force lines parallel to the plane of the metal stock, e.g., a longitudinal field principle is disclosed.

The transverse field heating is disclosed in EP 246 660 and DE 42 34 406 A1. Disclosed is a device for inductive transverse heating of flat goods, with the entire document disclosing a device formed of main spools and auxiliary spools. The main spools are arranged transverse to the transportation direction of the rolled stock, and they extend beyond both outer edges of the rolled stock.

The auxiliary spools extend parallel to the transportation direction of the flat stock and are arranged close to the edges of flat stock, without extending past the edges. The combination of main and auxiliary spools provides for a uniform temperature profile over the entire width of the rolled flat stock. The main spools heat in particular the middle region and both immediately adjacent edge regions of the flat stock, though close to the edges and parallel to these zones, a lower temperature prevails. These zones in vicinity of the edges are additionally heated by auxiliary spools, so that a uniform temperature distribution over the entire width of the flat stock takes place.

The drawings show embodiment examples of the invention. In the drawings:

FIG. 4 shows a perspective view of an inductor for heating the strip.

Figure 1:
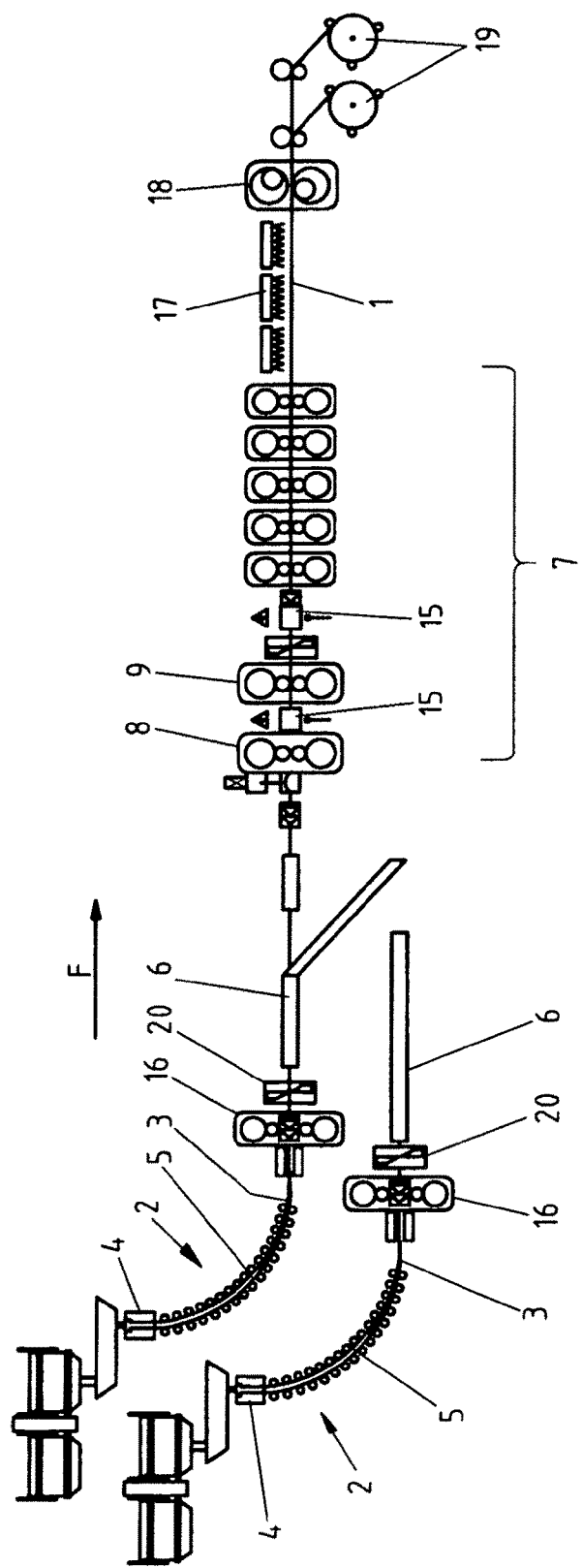
FIG. 1 shows a schematic view of a casting and rolling installation for manufacturing a steel strip according to the first embodiment.

FIG. 1 shows a sketch of a casting and rolling installation that includes a caster 2 and, arranged in the transportation direction F, following one another furnace 6 and a rolling train 7. The metal strip 1 which is rolled in the rolling train 7, is produced from a slab 3 that is cast in a mold 4 of the caster 2. In a strand guide 5, the cast slab is deflected from a vertical position to a horizontal position. As can be seen, there are provided two casters 2 which are arranged parallel to each other.

In the embodiment of FIG. 1, the rolling train 7 has two reinforced rolling stands 8, 9. It is essential that between the two rolling stands 8 and 9, there is provided an inducter 15 that heats the passing strip 1 in a desired manner. Between the rolling stand 9 and the following stand, a further inducter 15 is arranged.

FIG. 1 also shows other elements of the installation, namely, a roughing rolling stand 18 behind the caster 2 and furnace 6, and arranged behind the roughing rolling stand, shears 20.

Behind the rolling train 7, there is provided a cooling line 17, and following it in the transportation direction F, flying shears 18 and, finally, two coilers 19.

Figure 2:
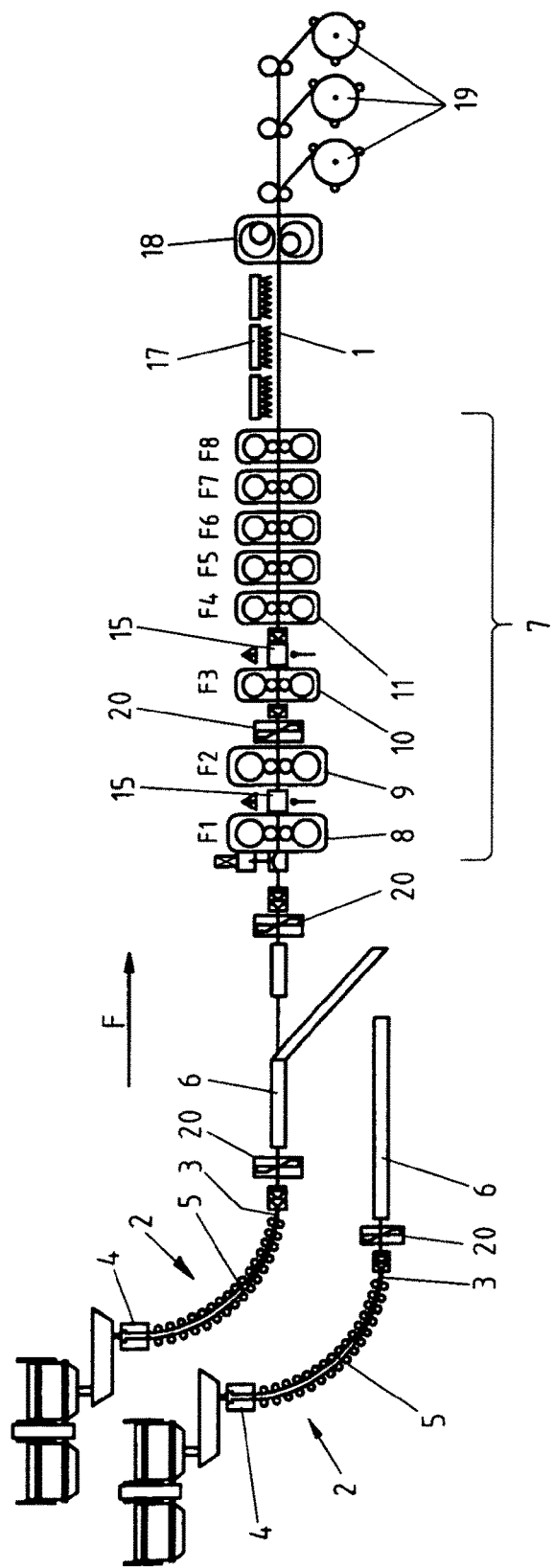
FIG. 2 shows a schematic view of the casting and rolling installation according to FIG. 1 in accordance with the second embodiment.

The embodiment according to FIG. 2 differs therefrom essentially in that a respective inductor 15 is arranged, in the rolling train 7, as between the rolling stands 8 and 9 so between the rolling stands 10 and 11.

Figure 3:
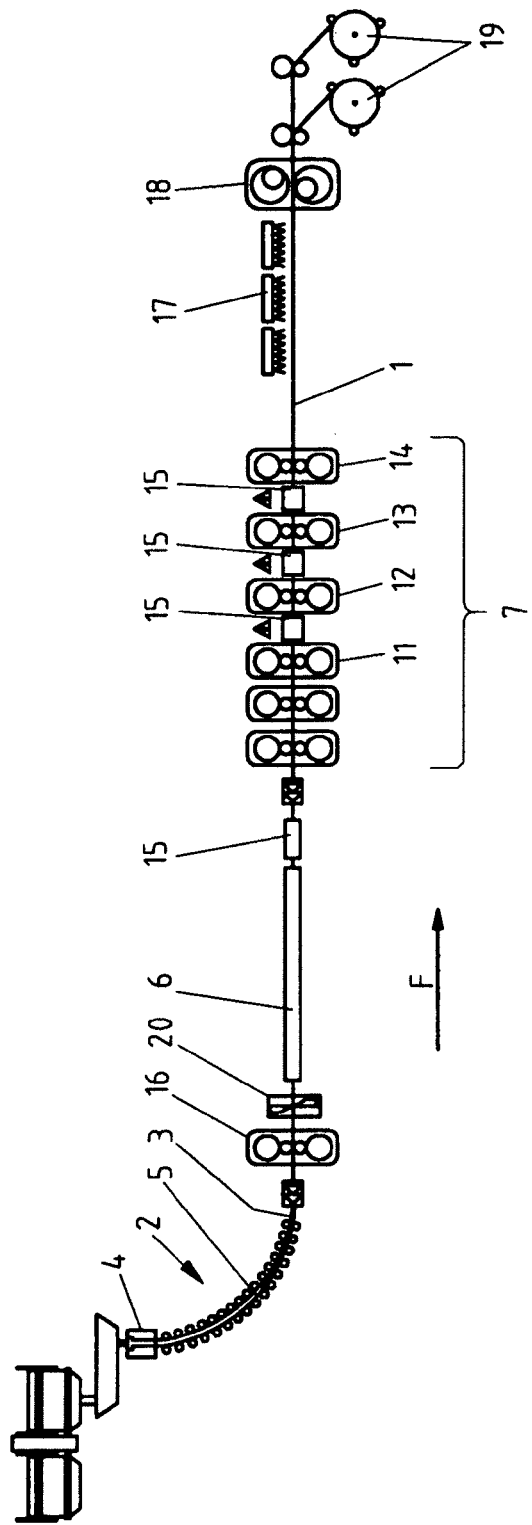
FIG. 3 shows a schematic view of the casting and rolling installation according to FIG. 1 in accordance with the third embodiment.

In the embodiment according to FIG. 3, different rolling stands are arranged in the rolling train 7, wherein between rolling stands 11 and 12, between rolling stands 12 and 13, and between the rolling stand 13 and 14, a respective inductor 15 is located.

FIG. 4 shows a perspective view of a configuration of an element which forms the inductor 15.

It can be seen that the metal strip 1 passes the inductor 15 in the transportation direction F. The inductor has open, partially C-shaped, induction spools which are very suitable for heating the metal strip 1.

For slabs or pre-strips having thickness between 6 and 80 mm, it is suggested to use induction with a longitudinal field. For slabs and pre-strips having thickness between 1 mm and 9 mm, induction in a traverse field is recommended. This applies to all of the operational modes to be executed in the shown installation, i.e., for batch operation, continuous operation, and semi-continuous operation.

LIST OF REFERENCE NUMERALS

1 Metal strip
2 Caster
3 Slab
4 Mold
5 Strand guide
6 Furnace
7 Rolling train
8 Rolling stand
9 Rolling stand
10 Rolling stand
11 Rolling stand
12 Rolling stand
13 Rolling stand
14 Rolling stand
15 Inductor
16 Roughing stand
17 Cooling line
18 Shears
19 Coiler
20 Shears
F Transportation direction

The invention claimed is:

1. Method of producing a metal strip (1) by casting and rolling, wherein first a slab (3) is cast in a caster (2) by dispensing metal from a mold (4), wherein the slab (3) is deflected from a vertical direction to the horizontal direction in a region of a strand guide (5), wherein the slab (3) is the tempered in a furnace (6), wherein the slab (3) is rolled in a rolling train (7) after the furnace (6), and wherein the slab (3) is processed either in discontinuous batch operation or in continuous or semi-continuous operation in accordance with a predetermined mode of operation, wherein the slab (3) to be rolled or the metal strip (1) being rolled is subjected to heating in a region of the rolling train (7) at least between two roll stands (8, 9, 10, 11, 12, 13, 14) by means of an inductor (15), characterized in that
an element having at least one open, partially C-shaped induction spool, is used as the inductor, and in that
induction spools of the inductor can be switched, as needed, for producing a longitudinal field induction or traverse field induction.

2. The method of claim 1, characterized in that the rolling train (7) is a tandem rolling train, wherein heating takes place, by the inductor (15) located, viewing in the transportation direction, between first two rolling stands (8, 9) of the tandem rolling train.

3. The method according to claim 1, characterized in that the rolling train (7) is a tandem rolling train, wherein heating takes place, by the inductor (15) located, viewing in the transportation direction, between first three rolling stands (8, 9, 10) of the tandem rolling train.

4. The method according to claim 1, characterized in that the slab (3) is subjected, in the region of the strand guide (5), to thickness reduction by a plurality of rolls.

5. The method according to claim 1, characterized in that the slab (3) is subjected to thickness reduction in a roughing stand (16) arranged downstream of the caster (2) and upstream of the furnace (6).

6. A method according to claim 1, wherein the slab is processed in a batch operation and the cutting of the slab takes place before the rolling train as late as possible after up to five roughing stands preceding the rolling train.

7. The method according to claim 1, wherein the slab is processed in a continuous operation and the cutting of the slab (3) takes place after the last stand in the rolling train.

8. The method according to claim 1, wherein semi-continuous operation, and cutting of the slab (3) takes place before the furnace (6) as late as possible after five roughing stands preceding the furnace (6).

9. The method according to claim 1, wherein the inductor is provided in front of and/or behind the furnace.

* * * * *